(12) United States Patent
Roszak et al.

(10) Patent No.: US 10,445,106 B2
(45) Date of Patent: Oct. 15, 2019

(54) PERSISTENT ENROLLMENT OF A COMPUTING DEVICE USING A BIOS

(71) Applicant: VMware, Inc., Palo Alto, CA (US)

(72) Inventors: Jason Roszak, Roswell, GA (US);
Craig Newell, Atlanta, GA (US);
Shravan Shantharam, Atlanta, GA (US); Varun Murthy, Atlanta, GA (US); Kalyan Regula, Alpharetta, GA (US); Blake Watts, St. George, UT (US)

(73) Assignee: VMware, Inc., Palo Alto, CA (US)

( * ) Notice: Subject to any disclaimer, the term of this patent is extended or adjusted under 35 U.S.C. 154(b) by 233 days.

(21) Appl. No.: 15/466,830

(22) Filed: Mar. 22, 2017

(65) Prior Publication Data
US 2018/0276000 A1 Sep. 27, 2018

(51) Int. Cl.
| G06F 15/177 | (2006.01) |
| G06F 9/4401 | (2018.01) |
| G06F 9/451 | (2018.01) |
| H04L 29/08 | (2006.01) |
| G06F 11/14 | (2006.01) |
| G06F 8/61 | (2018.01) |

(52) U.S. Cl.
CPC .......... *G06F 9/4416* (2013.01); *G06F 9/4401* (2013.01); *G06F 9/452* (2018.02); *G06F 11/14* (2013.01); *H04L 67/34* (2013.01); *G06F 8/61* (2013.01)

(58) Field of Classification Search
CPC ...... G06F 9/4416; G06F 9/452; G06F 9/4401; G06F 11/14; G06F 8/61; H04L 67/34

USPC ......................................................... 709/223
See application file for complete search history.

(56) References Cited

U.S. PATENT DOCUMENTS

| 5,974,546 A | 10/1999 | Anderson |
| 6,112,246 A | 8/2000 | Horbal |
| 6,205,579 B1 | 3/2001 | Southgate |
| 7,350,205 B2 | 3/2008 | Alviso |
| 7,594,107 B1 | 9/2009 | Parkhill |

(Continued)

FOREIGN PATENT DOCUMENTS

KR 100646359 11/2006

OTHER PUBLICATIONS

Microsoft ("Windows Platform Binary Table (WPBT)", Jul. 9, 2015, 12 pages) (Year: 2015).*

(Continued)

*Primary Examiner* — Wing F Chan
*Assistant Examiner* — Joseph R Maniwang
(74) *Attorney, Agent, or Firm* — Clayton, McKay & Bailey, PC

(57) ABSTRACT

Systems and methods are included for causing a computing device to install a management agent prior to an operating system completing its first boot. A bootstrap loader is flashed into firmware, such as the BIOS, of a computing device. The bootstrap loader installs an enroller that identifies a management agent. This can include downloading the management agent from a management server. The enroller can find or contact the management server by contacting an address provided in a WINDOWS Platform Binary Table (WPBT). The management agent is installed prior to the user logging into the operating system to prevent circumvention of management policies.

20 Claims, 10 Drawing Sheets

(56) References Cited

U.S. PATENT DOCUMENTS

| | | |
|---|---|---|
| 7,836,337 B1 | 11/2010 | Wu |
| 8,239,688 B2 | 8/2012 | De Atley |
| 8,332,496 B2 | 12/2012 | Gopalakrishnan |
| 8,555,273 B1 | 10/2013 | Chia |
| 8,578,361 B2 | 11/2013 | Cassapakis |
| 8,838,754 B1 | 9/2014 | Rao |
| 8,886,964 B1 | 11/2014 | Tonkinson |
| 9,112,749 B2 | 8/2015 | Dabbiere |
| 9,176,752 B1 | 11/2015 | Marr |
| 9,185,099 B2 | 11/2015 | Brannon |
| 9,507,581 B2 | 11/2016 | Butcher |
| 9,529,602 B1 | 12/2016 | Swierk |
| 9,846,584 B1 | 12/2017 | Khoruzhenko |
| 9,904,557 B2 | 2/2018 | Buhler |
| 10,044,695 B1 | 8/2018 | Cahill |
| 2001/0047514 A1 | 11/2001 | Goto |
| 2003/0014619 A1 | 1/2003 | Cheston |
| 2003/0097433 A1 | 5/2003 | Park |
| 2003/0115091 A1 | 6/2003 | Sawyer |
| 2003/0140223 A1 | 7/2003 | Desideri |
| 2004/0210362 A1 | 10/2004 | Larson |
| 2005/0149729 A1 | 7/2005 | Zimmer |
| 2005/0198467 A1 | 9/2005 | Zimmer |
| 2005/0204353 A1 | 9/2005 | Alviso |
| 2006/0200539 A1 | 9/2006 | Kappler |
| 2007/0133567 A1 | 6/2007 | West |
| 2007/0260868 A1 | 11/2007 | Azzarello |
| 2008/0046708 A1 | 2/2008 | Fitzgerald |
| 2008/0126921 A1 | 5/2008 | Chen |
| 2009/0198805 A1 | 8/2009 | Ben-Shaul |
| 2011/0099547 A1 | 4/2011 | Banga |
| 2011/0173598 A1 | 7/2011 | Cassapakis |
| 2011/0178886 A1 | 7/2011 | O'Connor |
| 2011/0191765 A1 | 8/2011 | Lo |
| 2011/0197051 A1 | 8/2011 | Mullin |
| 2012/0233299 A1 | 9/2012 | Attanasio |
| 2012/0265690 A1 | 10/2012 | Bishop |
| 2013/0212278 A1 | 8/2013 | Marshall |
| 2013/0212650 A1 | 8/2013 | Dabbiere |
| 2013/0283047 A1 | 10/2013 | Merrien |
| 2013/0339718 A1 | 12/2013 | Kanaya |
| 2014/0040605 A1 | 2/2014 | Futral |
| 2014/0109194 A1 | 4/2014 | Manton |
| 2014/0237236 A1 | 6/2014 | Kalinichenko |
| 2014/0235203 A1 | 8/2014 | Gonsalves |
| 2014/0244989 A1 | 8/2014 | Hiltgen |
| 2014/0280934 A1 | 9/2014 | Reagan |
| 2014/0282815 A1 | 9/2014 | Cockrell |
| 2014/0282894 A1 | 9/2014 | Manton |
| 2015/0056955 A1 | 2/2015 | Seleznyov |
| 2015/0067311 A1 | 3/2015 | Forristal |
| 2015/0074387 A1 | 3/2015 | Lewis |
| 2015/0089209 A1 | 3/2015 | Jacobs |
| 2015/0143508 A1 | 5/2015 | Halibard |
| 2015/0154032 A1 | 6/2015 | Chen |
| 2015/0237498 A1 | 8/2015 | Freedman |
| 2015/0296368 A1 | 10/2015 | Kaufman |
| 2016/0006604 A1 | 1/2016 | Freimark |
| 2016/0043869 A1 | 2/2016 | Smith |
| 2016/0065557 A1 | 3/2016 | Hwang |
| 2016/0087955 A1 | 3/2016 | Mohamad Abdul |
| 2016/0132310 A1 | 5/2016 | Koushik |
| 2016/0180094 A1 | 6/2016 | Dasar |
| 2016/0188307 A1 | 6/2016 | Reagan |
| 2016/0231804 A1 | 8/2016 | Bulusu |
| 2016/0266888 A1 | 9/2016 | Nieves |
| 2016/0364243 A1 | 12/2016 | Puthillathe |
| 2017/0140151 A1 | 5/2017 | Nelson |
| 2017/0235928 A1 | 8/2017 | Desai |
| 2017/0308706 A1 | 10/2017 | Ray |
| 2018/0054354 A1 * | 2/2018 | Wienstroer ......... H04L 41/0806 |
| 2018/0075242 A1 | 3/2018 | Khatri |
| 2018/0136946 A1 | 5/2018 | El-Haj-Mahmoud |
| 2018/0276002 A1 | 9/2018 | Roszak |

OTHER PUBLICATIONS

International Search Report dated Apr. 8, 2016 for Application No. PCT/US2015/066903.
International Search Report Written Opinion dated Jul. 9, 2018 for PCT/US2018/023654.
International Search Report dated Jul. 24, 2018 for International Application No. PCT/US2018/023658.
International Search Report dated Jul. 24, 2018 for International Application No. PCT/US2018/023657.
Office Action dated Sep. 14, 2018 for U.S. Appl. No. 15/783,635.
Office Action dated Sep. 18, 2018 for U.S. Appl. No. 15/466,835.
Office Action dated Feb. 15, 2019 for U.S. Appl. No. 15/466,835.
Office Action dated Feb. 12, 2019 for U.S. Appl. No. 15/244,837.
Office Action dated Jan. 2, 2019 for U.S. Appl. No. 15/466,841.
Office Action dated Jan. 2, 2019 for U.S. Appl. No. 15/466,844.
Office Action dated Jan. 11, 2019 for U.S. Appl. No. 15/783,635.
Notice of Allowance dated Apr. 25, 2019 for U.S. Appl. No. 15/466,835.
International Search Report dated Jun. 21, 2019 for Application No. PCT/US2018/052273.
Office Action dated Jul. 11, 2019 for U.S. Appl. No. 15/466,841.
Office Action dated Jul. 11, 2019 for U.S. Appl. No. 15/466,844.

* cited by examiner

PERSISTENT ENROLLMENT OF A COMPUTING DEVICE USING A BIOS

CROSS REFERENCE TO RELATED APPLICATIONS

This application is one of five related applications filed on Mar. 22, 2017. The following applications are incorporated by reference in their entireties: application Ser. No. 15/466,835, entitled "Persistent Enrollment of a Computing Device Using Vendor Autodiscovery," filed Mar. 22, 2017; application Ser. No. 15/466,837, entitled "Persistent Enrollment of a Computing Device Based on a Temporary User," filed Mar. 22, 2017; application Ser. No. 15/466,841, entitled "Configuring a Computing Device Using Managed Operating System Images," filed Mar. 22, 2017; and application Ser. No. 15/466,844, entitled "Internet Recovery of a WINDOWS Configuration," filed Mar. 22, 2017.

BACKGROUND

Enterprises often provide employees with corporate-owned computing devices, such as laptops, tablets, cell phones, and personal computers. These computing devices typically require an initial setup before being given to an employee. For example, an administrator may need to install a specific operating system and applications on the device. The administrator can also take steps to enroll the computing device with an Enterprise Mobility Management ("EMM") system before handing the device over to an employee. Without enrollment software installed on the computing device, the device would not be secure and an employee could lose or steal the device and any information on it. Installing the correct software, hardware, drivers, and configurations can be done as part of a device enrollment program ("DEP").

APPLE has its own DEP for its computing devices. Because APPLE provides its own software and hardware with its computing devices, they are able to easily enroll computing devices. This allows them to track device owners and configurations. However, there is no way for administrators to easily do this for WINDOWS devices or other personal computer ("PC") devices. Each PC device can include a different combination of hardware and software from multiple vendors. There is no central entity or repository that tracks ownership and configuration information, unlike in the APPLE ecosystem.

As a result, administrators do not know how to boot PC devices into a known golden image. The golden image only works when the device hardware and configurations are the same, which is unlikely in the PC ecosystem. A clean state requires an administrator to wipe each computing device and re-image it. Every time a user installs a new application, an administrator must create another golden image that it can use to re-flash the device. Repeating this for every department and enterprise division (human resources, sales, etc.) becomes time-consuming.

Additionally, outside of the APPLE ecosystem, there is no easy way for an original equipment manufacturer ("OEM") device supplier (also called a vendor) to load a custom company image onto user devices at the time they ship from the OEM. The user device configurations constantly evolve and it is impractical for an OEM to track the evolution. Therefore, the cumbersome task of individual user device setup falls to the enterprise. Multiplied by the number of employees in a workforce, the initial setup can be a major drain on company resources. These setup steps are repeated when a computing device malfunctions or is assigned to a new employee, or when an employee upgrades to a new device. Therefore, large organizations require additional IT manpower for provisioning employee devices, increasing the organization's overall costs. The setup process also produces delays in providing employees with new computing devices, which lowers the overall efficiency of the company's workforce.

Enterprises wishing to enroll the computing device into an EMM system must further manually configure each device. It generally is not feasible for the OEM to customize its operating system ("OS") image to include management features of the EMM system. This is because EMM functionality can vary, even between different employees in the same EMM system. EMM software is constantly changing, and expecting an OEM manufacturer to replace its OS image with each change would be unrealistic. Therefore, individual device configuration is currently required.

This can require user login into an OS prior to enrollment in the EMM. This gives a user opportunity to circumvent management policies, which are not yet installed in the non-enrolled device.

Trusted boot processes are also very fragmented across different providers of PC devices. Secure boot is one such process supported by WINDOWS, using hash encryption to ensure a secure version of WINDOWS with a particular BIOS version is loaded on the computing device. Each provider can attempt to specify the BIOS and software versions. In the PC ecosystem, there is no single trusted source to cause computing devices to boot with the right OS and software configurations for different enterprises or groups.

For similar reasons, device ownership is equally impossible to track. Each OEM hardware supplier (LENOVO, DELL, etc.) has different standards and sells through different channels, such as direct to enterprises and through stores like BEST BUY. There is no current way to track who bought the device from whom, who owns it, or configuration details after purchase. This is different from the APPLE ecosystem, where there is generally only one source for the computing devices. With a single source, device ownership can be reconstructed from a serial number and a receipt.

In the fragmented PC ecosystem, recovering PC device configurations is also very difficult. Without the ownership or configuration details, it is generally not possible to provide a clean version of the OS, installed software, and drivers. Therefore, Internet recovery has been lacking for PC devices up to this point.

Consequently, a need exists for a system for enrolling PC computing devices for EMM operation on first boot based on device ownership information. A need also exists for the computing devices to retrieve correct OS and application configurations while bypassing piecemeal administrator setup.

SUMMARY

Examples described herein include systems and methods for providing persistent enrollment for a computing device, including automatic enrollment upon first boot-up of the device. The terms "computing device," "user device," and "mobile device" are used interchangeably throughout and can encompass any type of computing device, such as laptops, tablets, cell phones, and personal computers.

Examples are provided for automatically enrolling a computing device with an EMM server upon first boot of the device. In one example, a bootstrap loader is included in firmware of the computing device. The firmware can be a BIOS or a Unified Extensible Firmware Interface ("UEFI"). Both types of firmware can perform similar functions and are the first code to run when the device is powered on. For the purposes of this disclosure, the terms BIOS or firmware may be used for convenience, but they are interchangeable with UEFI. The fundamental purposes of the firmware include initializing and testing hardware components on the device and loading an OS from a storage location. It can perform boot services, runtime services, initialize hardware in the computing device, load the OS, and hand off the hardware components to the OS.

When a computing device is powered on, the firmware can initialize hardware components and provide executable code for the OS to execute. In one example, a bootstrap loader can execute, launching an enroller. The enroller can wait for network connectivity and connect to a server to download additional executables and data that may change or not fit within the BIOS firmware. This can include applications, drivers, OS images, and managed policies for operating in with a mobile device management ("MDM") or EMM system.

In the example of a computing device running the MICROSOFT WINDOWS operating system, the firmware can include a Windows Platform Binary Table ("WPBT"). The bootstrap loader can be a binary in the WPBT. Additionally, a BIOS could include the location of an embedded copy of WINDOWS. Very early in the initial boot, the WPBT can be accessed, and the binary can be copied and executed.

This bootstrap loader binary can give an OEM a way to inject functionality into a system for execution by WINDOWS. In particular, it can allow the OEM to ensure the computing device contacts a server prior to the user logging into WINDOWS and preventing management functionality from properly installing.

In one example, the WPBT can include code that allows the computing device to retrieve a management agent. The management agent can include code that allows an enterprise to manage functional aspects of a device based on policies defined at a management server. The management agent can be injected, configured, or otherwise installed into WINDOWS prior to boot up of the OS. Therefore, before the user device ever fully boots for the first time, the management agent can implement a management policy. The management policy can enforce various functionalities and compliance rules. For example, passcode requirements can be specified, WIFI configurations provided, and network access controlled.

The management agent itself can be embedded in the firmware, such as in the bootstrap loader. Alternatively, a firmware process can cause a process to locate the management agent in a hidden drive partition. In another example, the firmware can specify a location where the enroller can download the management agent, such as at the management server. The management policies specified by the management server can differ based on the owner (also called tenant) of the computing device. In one example, an identifier, such as a serial number, can be supplied by the enroller to the management server. The management server can then identify a tenant associated with the computing device. Tenants can be different owners, such as different companies or different groups or organizations within a company.

This can allow a management server of an EMM system to take control of the computing device before the OS even loads. In one example, the management server can install and configure software according to a profile before the user even logs in. This can ensure that the enterprise maintains control over a user device. Even if someone wipes the computing device, the boot-up sequence will cause the installation of the management agent prior to the OS fully loading. This can be based on a flag in the firmware or code in the WPBT directing the computing device where to look for the management agent.

In one example, the bootstrap loader is a kernel code used for enrollment with the management server. The bootstrap loader need not perform enrollment functions itself; rather, the bootstrap loader can cause an enroller to install and execute some enrollment functions. Because the BIOS or UEFI can be a small piece of firmware, the bootstrap loader can be used to install the enroller, allowing the enroller to retrieve additional software needed to install management functions in the OS as it loads for the first time. The additional software can be retrieved locally, such as from an image on a hard drive, or over a network once a network interface is active.

In one example, the enroller waits for a network connection, such as an Ethernet or wireless internet connection. During that time, the OS can provide an interface for a user to connect to the Internet. Once connected, the enroller can utilize the Internet connection to query a server that contains ownership information for that computing device. In one example, the server is an OEM server operated by the manufacturer or vendor of the computing device. The computing device can submit an ownership information request to the OEM server (also called a vendor server). The request can include an identifier sufficient to identify the computing device, such as a serial number pulled from the BIOS. The OEM server can then determine whether the computing device is intended to be a managed device that is owned by an enterprise. If so, the OEM server can return an address, such as an enrollment URL, to the computing device with instructions to enroll the computing device using the URL.

If the OEM server indicates that the computing device should be enrolled, the enroller can pause the login process such that the user is not able to log in to the OS until the management agent is operational. For example, the enroller can pause a process associated with booting up the OS, causing the OS to pause while the enroller continues performing actions in a parallel manner.

Using the enrollment URL provided by the OEM server, the enroller can connect to the management server. The enroller can provide pre-enrollment information, such as the version of the OS installed on the computing device, the version of the enroller, and an identification of the computing device. The management server can determine whether the latest version of the enroller is installed, and if not, send an updated version of the enroller to be installed on the computing device before continuing the enrollment process.

The up-to-date enroller can continue the enrollment process by first registering the computing device with a WINDOWS agent that can perform various tasks. For example, the WINDOWS agent can assist in enrollment by connecting to the management server and providing any information required for enrollment. During the enrollment process, the management server can deliver a management agent to the computing device. The management agent can communicate with the management server and interface with the OS and firmware of the computing device. The management agent can assist in ensuring compliance rules and management policies set at the management server are carried out at the computing device. The enrollment process can also include downloading or removing applications and synchronizing the computing device with the settings supplied at the management server. Because the user has not been offered an opportunity to provide login credentials, the management server can enroll the computing device using a temporary user account.

With the computing device enrolled and compliant, the enroller can unpause the login functionality of the OS and allow the user to sign into the OS. In some examples, the OS login can be used to provide information about the user to the management server. For example, the management agent can capture user inputs such as login information, an email address, or an employee number. The management agent can send this information to the management server to associate the computing device with the user rather than with a temporary account. The management policy can also be updated based on, for example, a particular group to which the user belongs.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, firmware in a computing device enables the computing device to install a management agent prior to completion of an initial boot of an OS. The management agent can be any code that allows a management server to enforce management policies on the computing device. For example, the management can include functional rules that restrict access or functionality of one or more applications on the user device, and compliance rules for device usage with remedial actions, such as locking the device or wiping enterprise data. The management agent can also utilize usage data, such as user inputs, for various purposes. The management agent can be a standalone application or integrated into an OS. In one example, code for the management agent configures an existing WINDOWS management agent.

The firmware can allow the computing device to identify and install the management agent. The management agent can exist locally on the device, such as in an OS image in a hidden partition. Alternatively, it can be downloaded from a server, such as a management server.

In one example, an address for a server, such as a vendor server or management server, can be stored in the firmware. The firmware can include a WPBT in one example. The firmware can execute the contents of the WPBT on first boot. This can cause a bootstrap loader in the firmware to initiate an enroller process. The enroller can wait for network access and contact the server at the address. Alternatively, the enroller can check a hidden partition for a managed OS image to inject or otherwise merge with a normal OS image.

In one example, the enroller waits for network access and then contacts a vendor server. The vendor server can be associated with a manufacturer or supplier of the computing device. The vendor server can determine if a particular computing device is intended to be managed as part of an EMM system. This can be done, for example, based on device serial numbers that are also flashed into the firmware. If the device is to be managed, the vendor server can provide an address, such as a URL, that directs the computing device to the appropriate management server.

Using the address, the enroller executing on the computing device can download and install the management agent and perform an enrollment process with the management server. In one example, an updated enroller is first downloaded to facilitate this process. The updated enroller can block login in WINDOWS until enrollment completes. In this way, enrollment can be done prior to a user logging into the operating system for the first time, ensuring that the computing device is managed according to policies set by the device owner.

Figure 1A:
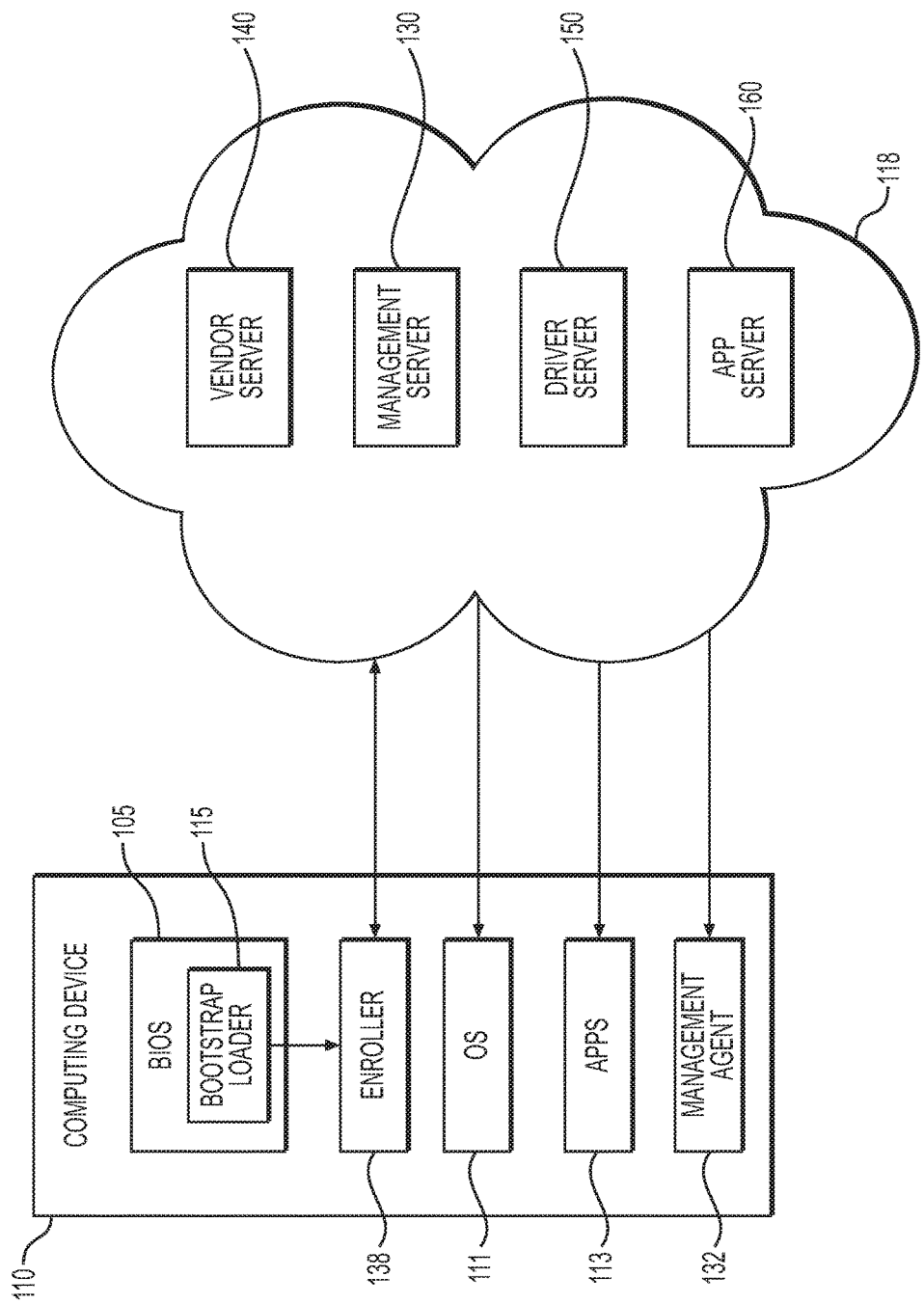
FIG. 1A is an exemplary illustration of system components for persistent enrollment of a computing device.

Turning to FIG. 1A, exemplary system components are illustrated. A computing device 110 can include firmware 105 that includes a bootstrap loader 115. The computing device 110 can be any processor-based device, such as a smartphone, laptop, tablet, personal computer, or workstation. It can be flashed with firmware 105, which can include a BIOS.

When the computing device 110 powers on, it can read the firmware 105 to initialize the boot process. This can include loading an OS 111. The OS 111 can be a WINDOWS operating system. The OS 111 can exist locally and be referenced by the firmware 105 in an example. For example, a drive partition in the computing device 110 can store a copy of the OS, which can be called an OS image.

The firmware 105 can also include a bootstrap loader 115 for device configuration and management purposes. Because firmware 105 space is limited, the bootstrap loader 115 can include enough code to launch an enroller 138 that reaches out over a network 118 for more assistance. The network 118 can be one or more of the Internet, a local network, a private network, or an enterprise network.

The enroller 138 can be responsible for installing applications and enrolling the computing device 110 with a management server 130. It can do so prior to the OS 111 allowing a user to log in. In one example, the enroller 138 blocks login by pausing one or more OS processes until enrollment, installation, and policy synchronization is complete. The enroller 138 can perform various software-based steps, such as connecting to external servers and pausing ongoing processes. The enroller 138 can operate in a parallel process to the operating system 111, such that it is independent from the operating system 111.

The firmware 105 can identify a management agent 132 in one example. This can be based on a flag or information in the WPBT. For example, the enroller 138 can download the management agent 132 from an address indicated by the flag or WPBT. Alternatively, the firmware 105 can include a copy of the management agent 132 or reference a local copy in a drive partition.

The bootstrap loader 115 or enroller 138 can initially wait for an operating system 111 application programming interface ("API") to become available. In the case of a WINDOWS operating system 111, for example, the bootstrap loader 115 can wait for one or more of the APIs in the WINDOWS API—the core set of APIs available within the WINDOWS operating system 111. In one example, the bootstrap loader 115 waits for the Win32 Subsystem API to become available.

In one example, the enroller 138 can download an updated version of itself from the management server 130. This can allow for more complex enrollment functionality than provided in the firmware 105. The enroller 138 can be updated to work with a particular version of an OS, or to include additional functions, network addresses, or server logins that are subject to change.

In one example, the firmware 105 can include a flag that causes the enroller 138 to communicate with a vendor server 140. The vendor server 140 can be associated with a manufacturer or supplier of the computing device 110. The vendor server 140 can determine whether the computing device 110 is supposed to be managed. If so, it can supply contact information for the appropriate management server 130.

When the vendor server 140 determines that the computing device 110 is managed by management server 130, it can provide an address for contacting the management server 130. This can allow the enroller 130 to download policy information. Policy information can include compliance rules and other limitations on device functionality. The policy information can differ between tenants, allowing the management server 130 to pick initial policy information based on the tenant associated with the computing device 110.

The policies provided can be based on ownership information associated with the computing device 110. The ownership information can be stored by either the vendor server 140 or management server 130, depending on the example. The server 130, 140 can track which computing devices 110 are supplied to which tenants. A tenant can be an owner, such as a corporation. Alternatively, it can be a group or division within a corporation. Groups can be used to apply different management policies to different devices, depending on the group.

In one example, the computing device 110 can request the ownership information from the management server 130. Ownership information can be keyed on device identifiers, such as serial numbers. An administrator can load ownership information into a server 130, 140 based on bulk orders or invoices. The management server 130 can use the ownership information to point the computing device 110 to drivers, applications, or OS images to install, which can be located at the management server 130 or on separate servers 150, 160 accessible over the network 118.

The management server 130 can control one or more managed applications 113 through interaction with the management agent 132 on the user device 110. The management agent 132 can be an application 113 or part of an operating system 111. In one example, the management agent 132 can be installed when the user device 110 enrolls with the management server 130. The management server 130 can be part of an EMM system. The management server 130 can dictate which managed applications 132 are installed, such as based on which tenant the computing device 110 belongs to. Similarly, specific functionality within the managed applications 113 can be enabled or disabled by the management server 130.

The management server 130 or vendor server 140 can supply additional addresses for driver servers 150 or application servers 160. This can allow the enroller 138 to contact these servers 150, 160 over network 118 and install device-specific or tenant-specific applications 113 and drivers. In one example, this can be performed prior to the enroller 138 unblocking login into the operating system 111. This can ensure that the appropriate drivers and applications 113 are on the computing device 110 before the user can access the operating system 111. This can mitigate chances of a user circumventing management policies.

In one example, rather than downloading individual drivers and applications, these components can be downloaded as part of OS images in one example. An OS image including the management agent can also be downloaded from the management server 130. A process initiated by firmware can assemble the OS images into a combined OS image. Then, the firmware can reboot the computing device using the combined OS image.

The servers 130, 140, 150, and 160 can each include one or more servers or processors. Alternatively, multiple servers 130, 140, 150, and 160 can be combined into a single server or set of servers. For example, the vendor server 140 indicated in the firmware can actually be the same as the management server 130, in an example. The fact that they are illustrated separately in FIG. 1A is non-limiting.

Figure 1B:
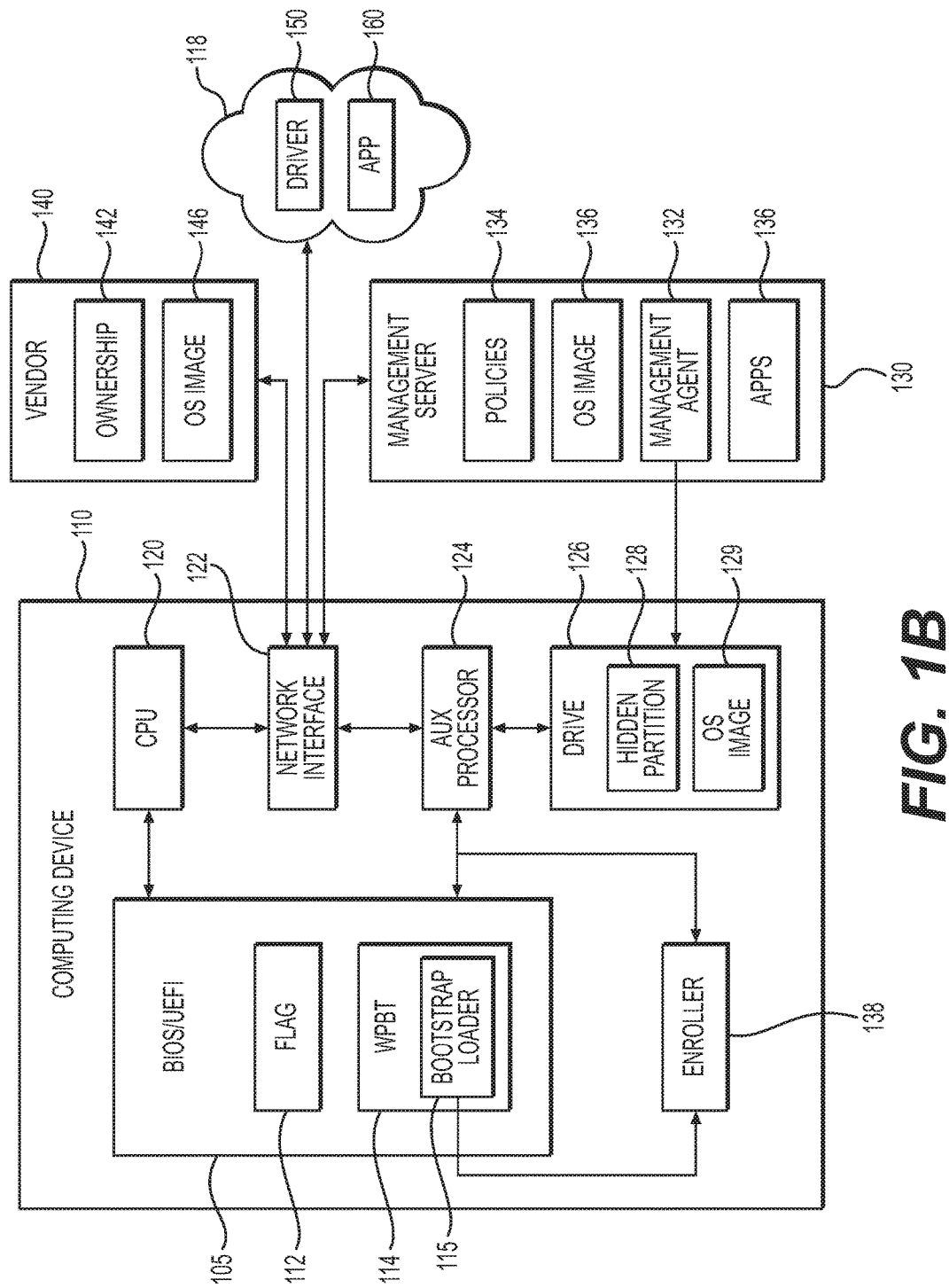
FIG. 1B is a more detailed exemplary illustration of system components for persistent enrollment of a computing device.

Turning to FIG. 1B, more exemplary system components are illustrated. The computing device 110 includes multiple processors, including a central processing unit ("CPU") 120 and an auxiliary processor 124. The enroller 138 can use the auxiliary processor 124 for pre-boot processes when the CPU 120 has not yet been enabled.

Additionally, the computing device 110 can include a drive 126, such as a hard disk drive or a solid state drive. The drive 126 can include a hidden partition 128. The hidden partition 128 can include an OS image 129. The OS image 129 can be executed to load the operating system 111, in an example.

Additionally, FIG. 1B shows that the firmware 105 can include a flag 112 that causes the computing device 110 to contact the vendor server 140, management server 130, or both, during boot. To do so, the enroller 138 can wait for a network interface 122 to activate. For example, the Win32 Subsystem can turn on the network interface 122. The firmware 105 can contain requisite drivers in one example. For example, a network stack in the firmware 105 can activate the network interface 122. Alternatively, the drivers can be loaded as part of the OS image 129 or independently stored on the drive 126.

The flag 112 or WPBT 114 can initiate persistent enrollment in one example. The contents of the WPBT 114 can execute on initial boot, causing a bootstrap loader 115 in the WPBT to launch an enroller 138. The WPBT 114 is a fixed Advanced Configuration and Power Interface ("ACPI") table that the BIOS or UEFI interface can provide to the operating system 111. The firmware 105 can provide this to the operating system 111 without modifying the WINDOWS image stored on the computing device 110 (if one exists). Therefore, regardless of any changes to the operating system 111 of the computing device 110, the WPBT 114 survives intact and is always present before the operating system 111 is loaded.

The location of the WPBT 114 is described in the Root System Description Table or Extended System Description Table ("RSDT/XSDT"). The RSDT/XSDT is an ACPI table that contains an array describing the physical addresses of all other ACPI tables. During initialization of the operating system 111, WINDOWS can parse the RSDT/XSDT table to obtain the location of the other ACPI tables, such as the WPBT 114. WINDOWS can copy the contents of an ACPI table into operating system memory and execute it as desired.

This can allow boot processes, such as the bootstrap loader 115, to add management functionality to a generic version of WINDOWS during the initial boot. In one example, a copy of WINDOWS already resident on the computing device 110 begins to load. A BIOS flag 112 can be set to enable WPBT 114. Based on the BIOS flag 112 being set, the auxiliary processor 124 can access the WPBT 114, where it locates the bootstrap loader 115. The bootstrap loader 115 can initiate a process called the enroller 138, which can execute outside of the firmware 105. The enroller 138 can be responsible for altering a generic WINDOWS OS 111 to apply management policies 134 and other functionality needed to operate in a MDM system.

In an example, the WPBT 114 is accessed on the first boot of the computing device 110. This can be based on a BIOS flag 112 being set, or based on the WINDOWS OS image 129 being hardcoded to check the WPBT 114. For example, SmpExecuteCommand can be coded to check the WPBT 114. This allows the enrollment process to initiate and management policies 134 to be implemented prior to the user ever logging into the operating system 111. This is different than prior uses of the WPBT, such as COMPUTRACE, which do not utilize the WPBT on first boot.

As an example, the enroller 138 can retrieve an address from the firmware 105. The address can be coded into the enroller 138 based on the bootstrap loader 115, in one example. The address can also be at a location in the WPBT 114 or elsewhere in the firmware 105.

Alternatively, the flag 112 can indicate the address. In one example, a functioning WINDOWS OS 111 need not be present on the device for the flag 112 to initiate enrollment. The address can correspond to a vendor server 140 or a management server 130. When contacted by the enroller 138, the vendor server 140 can use a device identifier received from the computing device 110 to determine management status or device ownership 142. In another example, device ownership is tracked at the management server 130. Either server 130 or 140 can maintain a table of device serial numbers mapped to tenant information. The tenant information can include a second address for a tenant (such as an owner) of the computing device 110.

In one example, the vendor server 140 can send an address of the management server to the enroller 138. Using the address, the enroller 138 can contact the management server 130. This management server 130 can determine the tenant(s) associated with the computing device 110 (and also confirm that the computing device 110 is to be managed) based on a device identifier, such as serial number. Then the appropriate policies 134 can be applied to the computing device 110.

Although the user is still unknown, the management server 130 can determine applicable policies 134 based on the tenant. A tenant can be an enterprise or a group within an enterprise. Different groups (one example of a tenant) can be used by the management server 130 to apply policies 134, such as compliance rules, to computing devices 110 associated with the group. A group can correspond to a structure or hierarchy of a business or enterprise. For example, an enterprise can have various groups such as an engineering team, an accounting team, and a marketing team. Each of these teams can correspond to a different group stored on the management server 130.

The policies 134 can also include compliance rules. A compliance rule can set forth one or more conditions that must be satisfied in order for a computing device 110 to be deemed compliant. If compliance is broken, the management server 130 can take steps to control access of the user device 110 to enterprise files, applications, and email. Compliance rules can be assigned differently to the different organizational groups. For example, a developer group can be assigned different compliance rules than an executive group. The executive group might be allowed to install different applications than the development group. Similarly, the management server 130 can assign different compliance rules based on the different location-based organizational groups.

The management agent 132 and policies 134 can be downloaded to the user device 110. The management server 130 can also supply managed apps 136 for installation at the computing device 110, according to policies 134 that apply to that computing device 110.

The entire management agent 132 need not be downloaded in some examples. For example, the firmware 105 can be flashed to contain a copy of the management agent 132. This can allow the computing device 110 to inject the management agent 132 into the operating system 111 during boot. In another example, the OS image 129 provided on the computing device 110 contains the management agent 132. In yet another example, the hidden partition 128 of the drive 126 on the computing device 110 contains the management agent 132. In still another example, the management agent 132 that is downloaded comprises settings for an existing management agent 132 that is part of WINDOWS.

In still another example, the operating system 111 is comprised of multiple OS images 129, 146, and 136 that are combined for installation. The management server 130 or vendor server 140 can provide a pre-enrollment installer that acts like the enroller 138 but is used to download and assemble the OS images 129. The pre-enrollment installer can be a mini operating system for use in a pre-boot environment. The pre-enrollment installer can run independently of an operating system 111, such as WINDOWS. So even when the computing device 110 does not have an uncorrupted OS image 129, the pre-enrollment installer can execute, in an example. In that example, instead of relying on the OS 111 for networking, the pre-enrollment installer can continue to use the networking stack provided in the firmware 105. This allows the stages to continue operation before WINDOWS begins to load. The server(s) 130 and 140 can also provide multiple addresses for downloading the OS images 129, 136, 146. Other third party servers can provide additional drivers 150, apps 160, or OS images containing drivers 150 and apps 160.

Figure 2:
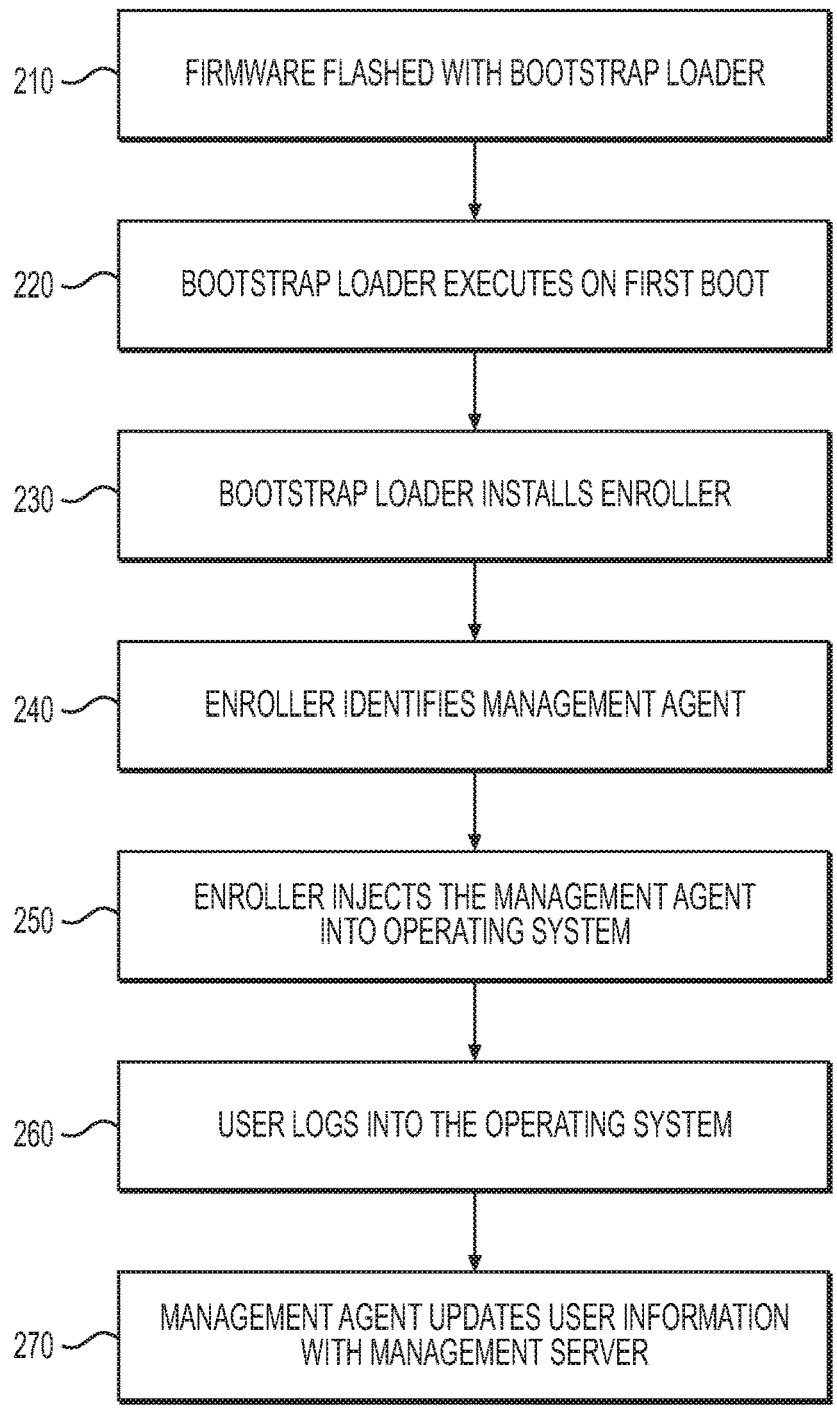
FIG. 2 is a flowchart of an exemplary method for installation of a management agent prior to a user logging into an operating system on first boot.

Turning to FIG. 2, example stages for using firmware to install a management agent on the first boot are shown. At stage 210, the firmware 105 of the computing device 110 is flashed to include a bootstrap loader 115. This can be done by a manufacturer. In one example, a vendor (which can include a manufacturer) can include a bootstrap loader 115 in the firmware 105. The bootstrap loader 115 can be configured to look for code in a hidden partition 128. For example, a special OS image 129 with a management agent 132 and management policies 134 could be accessed.

In another example, the firmware 105 can allow for persistent enrollment or Internet recovery of multiple tenants that use different OS images, applications, and management policies. In this example, a flag 112 or other bits in the firmware 105 can be set to cause the computing device 110 to contact the vendor server 140 (or management server 130). This can allow the server 130 or 140 to track device ownership separately, and supply the management policies 134 and applications 136 that correspond to the tenant.

At stage 220, when the device is powered on, a bootstrap loader 115 executes. The bootstrap loader 115 can execute based on a flag 112. This can occur on first boot and on subsequent boots. The flag 112 can be flashed in firmware 105 by the manufacturer. In one example, the flag 112 can reside in the WPBT 114 or point the processor to check the WPBT 114 on boot. In an example, the WPBT 114 is accessed on the first boot based on a BIOS flag 112 being set, or based on the WINDOWS OS image 129 being hardcoded to check the WPBT 114. For example, SmpExecuteCommand can be coded to check the WPBT 114. However, special versions of WINDOWS are not necessary in some examples. Instead, the BIOS flag 112 and WPBT 114 can initiate the process of customizing the standard operating system 111 to include the management functionality.

The bootstrap loader 115 can install and execute the enroller 138 at stage 230. The enroller 138 can retrieve additional resources from over the network 118. For example, it can be pre-coded to call an address associated with the vendor server 140 or management server 130.

At stage 240, the management agent 132 is identified. In one example, a flag 112 causes the enroller 138 to retrieve a management agent 132 from the WPBT 114. In another example, the enroller 138 can download the management agent 132 and management policy information 134. For example, the enroller 138 can wait for network access and then contact a server 130, 140. The server 130, 140 can check ownership information 142 associated with the computing device 110. For example, server 130, 140 can receive an identifier, such as a serial number or service tag, from the computing device 110. The serial number can be individually flashed into the BIOS 105 in an example. The server 130, 140 then checks the ownership information 142 to see whether the computing device 110 or a tenant associated with the computing device 110 is managed.

In one example, the vendor server 140 provides the enroller 138 with an address of the management server 130, based on determining that the computing device 110 is a managed device. The enroller 138 can contact the management server 130 and implement management policies 134 prior to the user ever logging into the operating system 111. Alternatively, the server 130, 140 can send the management agent 132 to the computing device 110 without supplying the additional address.

This can all occur on initial boot, before WINDOWS completely loads. This helps minimize the chances of managed configurations being circumvented.

At stage 250, the enroller 138 can inject the management agent 132 into the operating system 111. In one example, the enroller 138 accesses an operating system 111 API. The management agent 132 can implement various methods prior to the operating system 111 fully loading. The enroller 138 can also perform an enrollment process with the management server 130, during which time the appropriate management policies 134 are implemented at the computing device 110. The enroller 138 can also pause loading of the operating system 111 to allow for these processes to complete before allowing the user to login to the operating system 111.

In another example, the computing device 110 can download an OS image 136 that includes the management agent 132. The OS image 136 can be a partial image of the overall file system that makes up the operating system 111. The OS image 136 can already include the management agent 132 integrated into management features of the operating system 111. The management OS image 136 can be combined with another OS image 129 to create the full modified operating system 111. Then the enroller 138 can cause the computing device 110 to reload the modified operating system 111, effectively injecting the management agent 132 into the operating system 111 at stage 250.

During enrollment, the enroller 138 can pause one or more binaries that execute as part of the operating system 111 startup. Multiple binaries must complete in sequence for the operating system 111 to load successfully. By pausing one or more of them, the user will not be presented with a login screen.

After management policies 134 are in place, the enroller 138 can un-block the login process. At stage 260, the user can log into the operating system 111. In one example, the operating system 111 can present a series of screens designed to collect user information for completing enrollment at the management server 130. The management agent 132 can collect user inputs (such as login information) and send those inputs to the management server 130 at stage 270. The management server 130 can then associate the device enrollment with the user.

Figure 3:
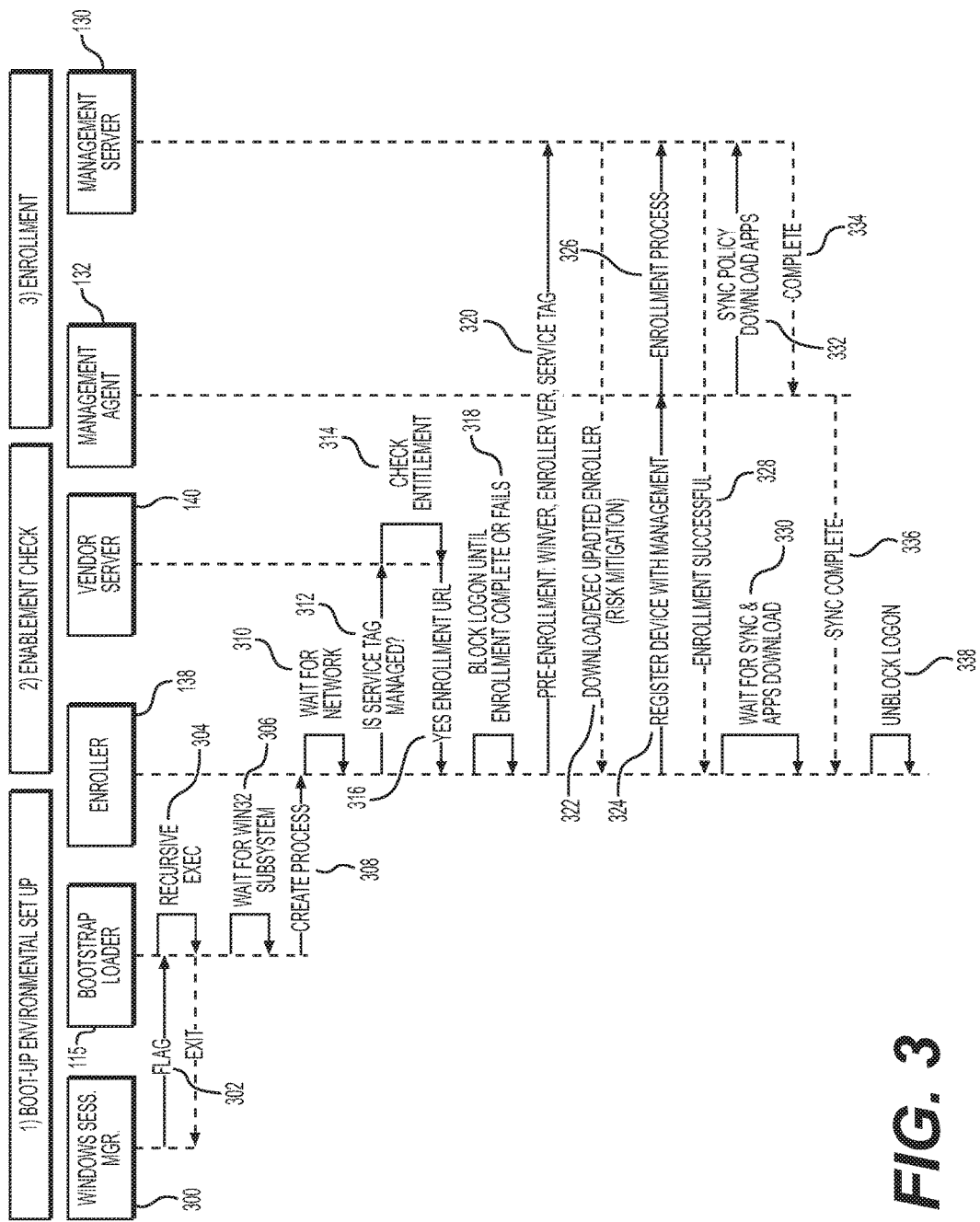
FIG. 3 is a flowchart of an exemplary method for performing enrollment of a computing device at a management server.

FIG. 3 is an example illustration of steps performed for vendor auto-discovery in one example. FIG. 3 includes stages for boot-up environmental setup, enablement check (e.g., vendor auto-discovery), and MDM enrollment.

In this example, a WINDOWS session manager 300 can execute as part of a WINDOWS image 129 that begins loading on the computing device 110. At stage 302, the WINDOWS session manager 300 can execute a bootstrap loader 115. The bootstrap loader 115 can be a kernel driver stored in the WPBT 114. In another example, the firmware 105 can detect a flag 302 independently of WINDOWS.

There are at least two ways the bootstrap loader 115 can start up. First, a flag 112 in the BIOS 105 can indicate that the WPBT 114 contents should be executed. Because the bootstrap loader 115 is in the WPBT 114, it will execute. Alternatively, the WINDOWS session manager 300 can issue an SmpExecuteCommand that executes the bootstrap loader 115.

The bootstrap loader 115 can recursively execute in the firmware at stage 304. It waits for the operating system 111 to boot further so that it can cause execution outside of kernel mode to begin. In one example, it can wait for the WIN32 subsystem to initialize at stage 306. The WIN32 subsystem can allow the bootstrap loader 115 to execute an enroller 138 at stage 308.

The enroller 138 can be extracted from a compressed file in one example. It can include an image, such as an animated .GIF, that displays while the enrollment stages take place. It can also execute as a Local System WINDOWS user in one example.

Upon initialization, the enroller 138 can have incomplete configuration information. It can execute outside of the firmware and have one or more dependencies that determine when the enroller 138 actually starts. For example, at stage 310, the enroller can wait for network 118 access. This can include waiting for a network interface 122 to be activated by WINDOWS or other firmware boot processes.

Once the network is available, the enroller 138 can contact a vendor server 140 at stage 312. This can allow the enroller 138 to determine whether the computing device 110 is a managed device. The address of the vendor server 140 can be included in the firmware 105 and the enroller 138 can be loaded with this address. Using the address, the enroller 138 can send an ownership information request to the vendor server 140. This can allow the vendor server 140 to determine whether the computing device 110 is a managed device and where enrollment should take place. The vendor server 140 can check entitlement at stage 314, such as by checking stored ownership information 142. In one example, the request at stage 312 includes a device identifier. Examples include a serial number or service tag that is flashed into the firmware 105 of the computing device 110. For the purposes of this disclosure, the terms serial number and service tag are interchangeable, and any unique identifier of a computing device 110 can be used.

The vendor server 140 can use the device identifier to search an ownership table in one example. Alternatively, the ownership table can be maintained and searched by the management server 130. The table can indicate whether the computing device 110 is managed. It can also link the device identifier to one or more addresses of other servers. This can allow the enroller 138 to contact the other servers to download drivers 150, apps 160, a management agent 132, and management profile information 134. The example of FIG. 3 is focused primarily on the MDM enrollment aspects.

At stage 316, in response to determining the computing device 110 is managed, the vendor server 140 returns an address for a management server 130. The address can be an enrollment URL. If, instead, the vendor server 140 were to indicate the computing device 110 is not managed, then the enroller 138 can delete itself and the operating system 111 can continue booting as normal.

After the enroller 138 receives indication that the device is managed, it can pause initialization of the operating system 111 at stage 318. The enroller 138 can do this after being notified that it needs to enroll with the management server 130. Pausing operating system 111 initialization can ensure that enrollment can advance and management policies 134 can be enforced prior to a user gaining access to the operating system 111. In one example, the enroller 138 blocks user login at the operating system 111 by blocking execution of binaries necessary to generate the login screen.

At stage 320, the enroller 138 can send an enrollment request to the management server 130. The enrollment request can include pre-enrollment information, such as a version of WINDOWS, an enroller version, and a device identifier (such as a service tag). This can allow the management server 130 to determine appropriate next steps.

For example, if the enroller 138 is not up-to-date, the management server 130 can send an updated enroller 138 to the enroller 138 at stage 322. This can allow the enroller 138 to update itself. The updated enroller 138 can include more functionality or OS compatibility than the original enroller 138. Additional features can be added in this manner to save space in the BIOS 105. Because firmware 105 space is limited and varies between different computing devices 110, functions that are prone to change can be left out of the original enroller 138. The management server 130 can update enroller 138 functionality based on the version of WINDOWS that the computing device 110 is loading. Downloading an updated enroller 138 can save space in the firmware 105, which otherwise might need to contain a bootstrap loader 115 that could launch several different enrollers 138 for compatibility purposes.

At stage 324, the enroller 138 can begin registering the computing device 110 with the management server 130. This can include configuring a management agent 132 on the computing device 110. The management agent 132 can be part of WINDOWS in one example. In another example, the management agent 132 can be part of the updated enroller 138 downloaded from the management server 130. The enroller 138 and management server 130 can configure the management agent 132 to communicate with the management server 130.

The management agent 132 can perform an enrollment process with the management server 130 at stage 326. In some examples, the management server 130 can request a token from the computing device 110, indicating that the computing device 110 has been authenticated and is permitted to continue the enrollment process. Upon receiving the token, the management agent 132 and management server 130 can continue the enrollment process.

At stage 328, the management server 130 can indicate that the management agent 132 is successfully enrolled.

At stage 330, the enroller 138 can wait for the computing device 110 to synchronize with the management server 130. This can include downloading management policies 134 and applications 136 at stage 332. In one example, the management server 130 can also provide addresses, such as URLs, to additional servers 150 and 160 where drivers and applications can be downloaded. The enroller 138 can contact the servers 150, 160 at those URLs and receive applications, drivers, or an OS image.

Because the user has not identified themselves (e.g., OS 111 login is blocked), enrollment and synchronization at the management server 130 can be based on a temporary user. In one example, the enroller 138 creates a temporary user in the OS 111 to associate with a device account. The management server 130 can specify the name and password information for the temporary user in one example. This will be described in more detail with regard to FIG. 4, below.

Continuing with FIG. 3, at stage 334, the management server 130 can notify the management agent 132 that enrollment synchronization and downloads are complete. The management agent 132 can communicate with the enroller 138 at stage 336, causing the enroller 138 to unblock the WINDOWS login at stage 338. The management agent 132 can monitor user inputs during login and report the inputs to the management server 130 for refining the enrollment for the specific user.

Figure 4:
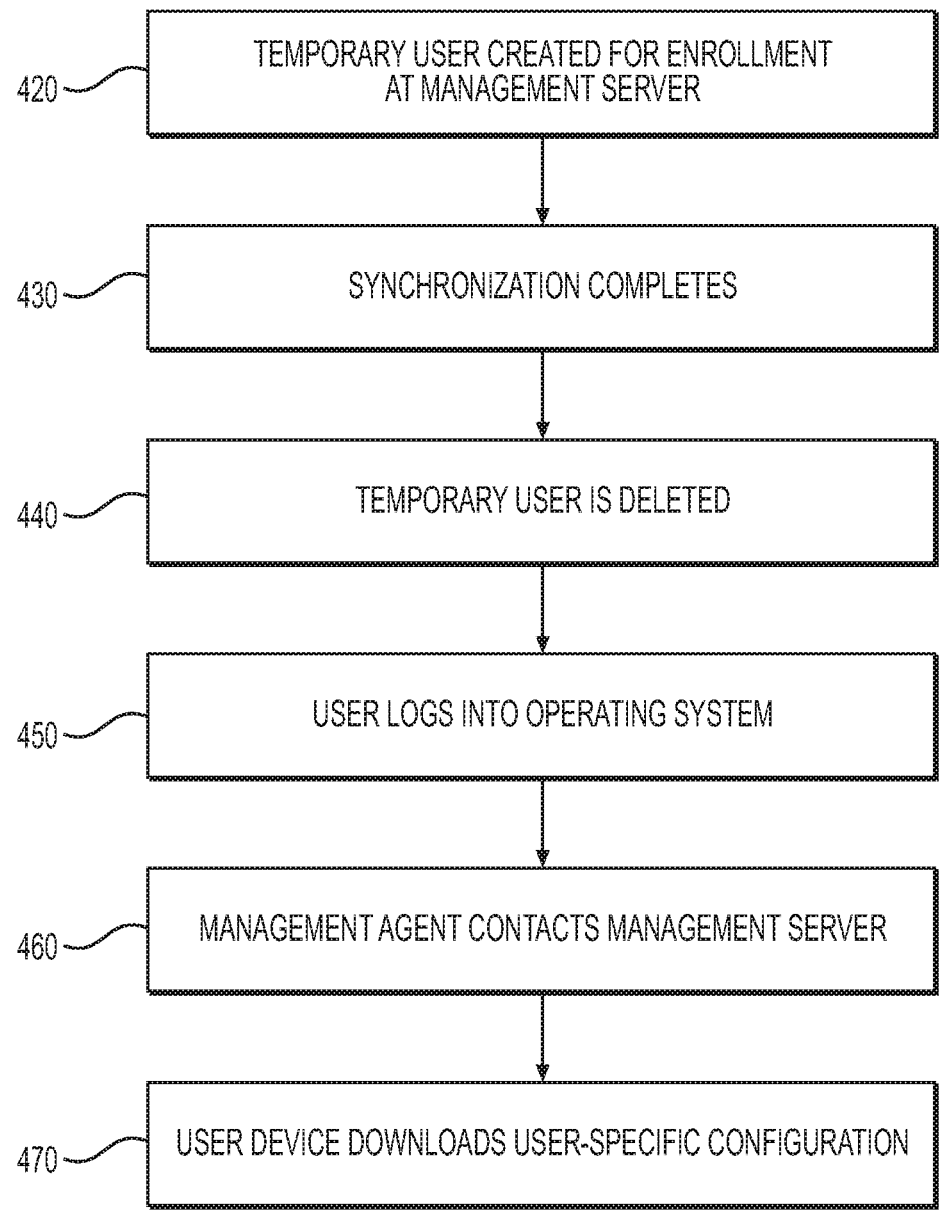
FIG. 4 is a flowchart of an exemplary method for preventing a user from logging into an operating system while enrollment takes place.

FIG. 4 illustrates exemplary stages for using a temporary user account during enrollment. A temporary user account can be created to provide the user with visual enrollment feedback, and to facilitate the enrollment of the computing device 110, which has not had users assigned to it yet during the initial boot.

At stage 420, a temporary user account is created. In one example, the enroller 138 executes as a Local System user in WINDOWS. The temporary user account can be created, for example, in an XML file that WINDOWS executes during normal setup. The XML, file can be created by the enroller 138. The enroller 138 can be updated from the management server 130 to prevent hijacking of access credentials from the firmware 105. The account name can be anything that the enroller 138 writes to the XML, file. The temporary user does not need administrative rights to be used in the enrollment process with the management server 130. In one example, the password is a complex password automatically generated by OOBE, which is an audit mode for booting WINDOWS. It can be stored temporarily in the registry and deleted once the user logs into WINDOWS.

The enroller 138 can wait for enrollment synchronization to complete. During this time, the enroller 138 can create a graphical interface that provides feedback to the user indicating enrollment is occurring.

At stage 430, synchronization and initial enrollment completes. The enroller 138 or management agent 132 can delete the temporary user at stage 440, including deleting the password from the registry. This can prevent a user from discovering the temporary user credentials in an attempt to circumvent the pre-boot enrollment. Additionally, the enroller 138 can remove the user interface since enrollment is no longer occurring. Any other logs or other files can also be deleted to leave the newly-booted operating system 111 in a clean state.

The enroller 138 can un-pause WINDOWS boot. Once the boot is complete, enroller 138 can delete itself.

At stage 450, the user logs into WINDOWS. The management agent 132 can detect the login and capture user information, including the user name.

At stage 460, the management agent 132 can contact the management server 130 to update the enrollment association to the newly discovered user. The management server 130 can transfer the WINDOWS enrollment from the temporary user to the new user. If the temporary user is not already removed, the management agent 132 can remove it.

At stage 470, updated policy information 134 based on the actual user can download and synchronize at the computing device 110.

Figure 5A:
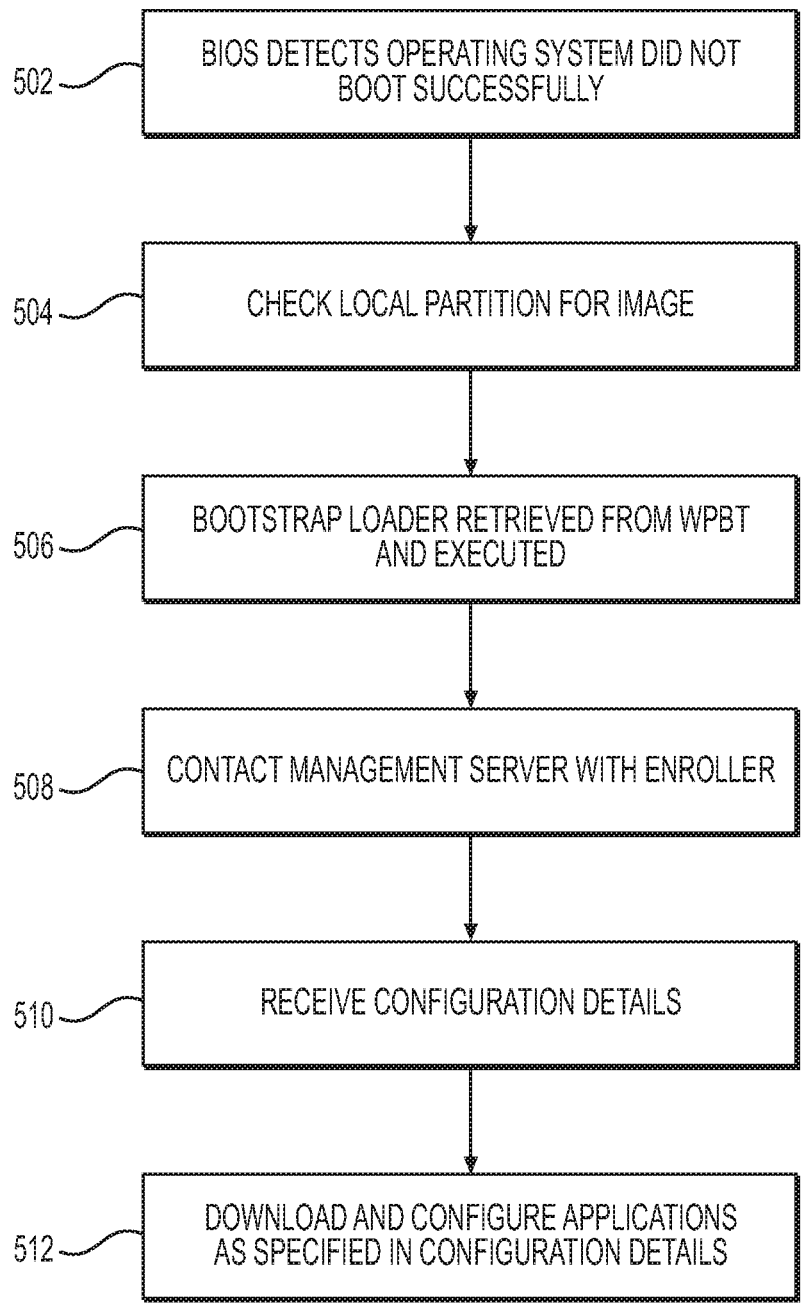
FIG. 5A is flowchart of an exemplary method for recovering a trusted image over a network.
Figure 5B:
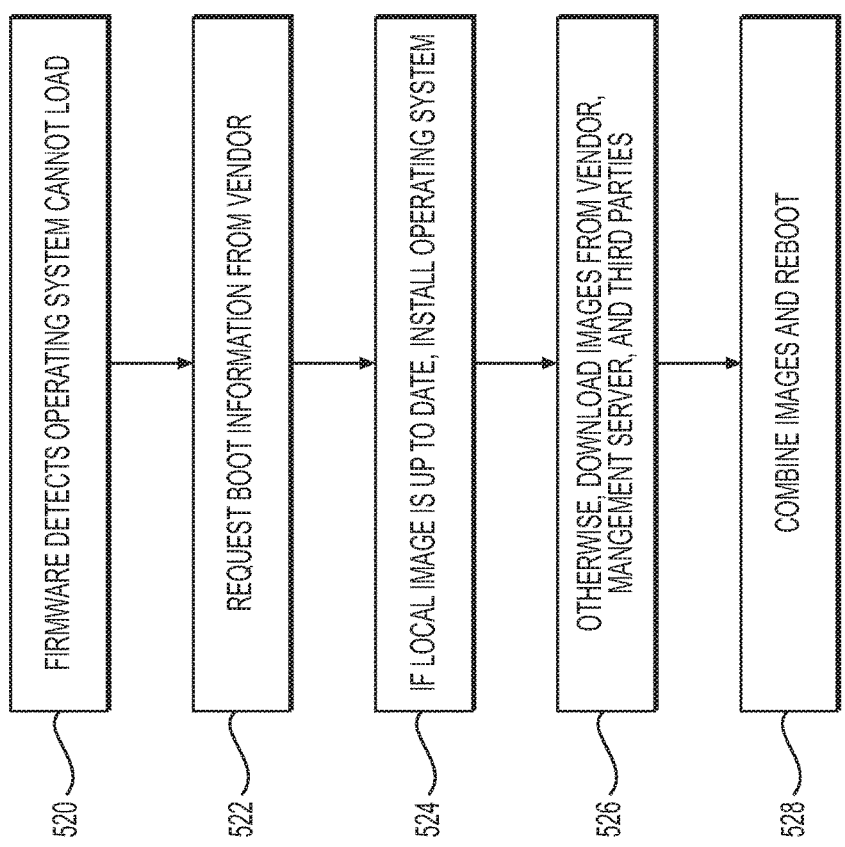
FIG. 5B is flowchart of an exemplary method for remotely managing BIOS settings of a user device.

FIGS. 5A and 5B include stages for Internet recovery when a device is corrupted or OS files are deleted. In one example, the BIOS 105 can rebuild the user device. A firmware 105 process, such as the bootstrap loader 115 or flag 112 can initiate a connection to a server 130, 140 to discover or download what it needs for a full restore. The process can be carried out by the enroller 138 or pre-enrollment installer.

Turning to FIG. 5A, at stage 502 the BIOS 105 can detect that the operating system 111 did not boot successfully. This can be because there is no operating system 111 present or because one or more binaries did not execute.

At stage 504, the BIOS 105 can check a local hidden partition 128 for an OS image 129. The OS image can begin booting. Otherwise, the BIOS 105 can contact a server 130, 140 defined in the firmware to download a copy of WINDOWS using a network stack in the firmware 105.

At stage 506, the bootstrap loader 115 can execute and wait for the Win32 Subsystem API to become available. Once Win32 is available and the network interface is active, the computing device 110 can execute an enroller 138 and contact a vendor server 140 specified in the firmware 105. The vendor server 140 can notify the enroller 138 of the computing device's 110 management status.

If it is a managed device, at stage 508 the enroller can contact the management server 130 at an address received from the vendor server 140. The management server 130 can then enroll the computing device 110.

At stages 510 and 512, the management server 130 can also point the enroller to other servers for downloading applications 160 and drivers 150 consistent with a stored configuration for the computing device 110. In one example, the management server 130 provides the address of a company server associated with the owner of the computing device 110. The company server can dictate which apps 160 and drivers 150 to download. Alternatively, some applications 136 can be provided by the management server 130.

The applications 160 and drivers 150 can be provided as part of an OS image in an example. Alternatively, they can be retrieved and installed after an OS image begins booting.

This can allow computing device 110 to recover their trusted image and settings by downloading them from a trusted source using the Internet.

Turning to FIG. 5B, an alternate method of Internet recovery is presented. At stage 520, the firmware 105 detects that an operating system 111 cannot load or does not exist.

At stage 522, firmware 105 can request boot information from a server 130, 140. The firmware 105 can contain the server 130, 140 location and execute a network stack to connect.

At stage 524, the server 130, 140 can return information identifying a local OS image 129 or an address to contact. If the local OS image 129 exists, the system can reboot using the local OS image 129.

Otherwise, as stage 526, the computing device 110 can download a pre-enrollment installer from the management server 130. The management server 130 or other server can provide the pre-enrollment installer with addresses for downloading OS images from one or more of the vendor server 140, management server 130, and third parties, such as a company server.

At stage 528, the pre-enrollment installer can combine the OS images for use on a reboot. Once all the required OS images are downloaded, the firmware 105 can extract the images to a local storage partition. This can include the management OS image, which can be overlaid onto the final extracted image. This can include splicing or injecting the image over the top of a WINDOWS base installation image.

Then, the pre-enrollment installer or firmware 105 can reboot the machine, leading to normal WINDOWS setup and device enrollment. The enrollment components can take effect during normal WINDOWS installation, causing the appropriate management policies to be downloaded and enforced on the computing device.

Figure 6A:
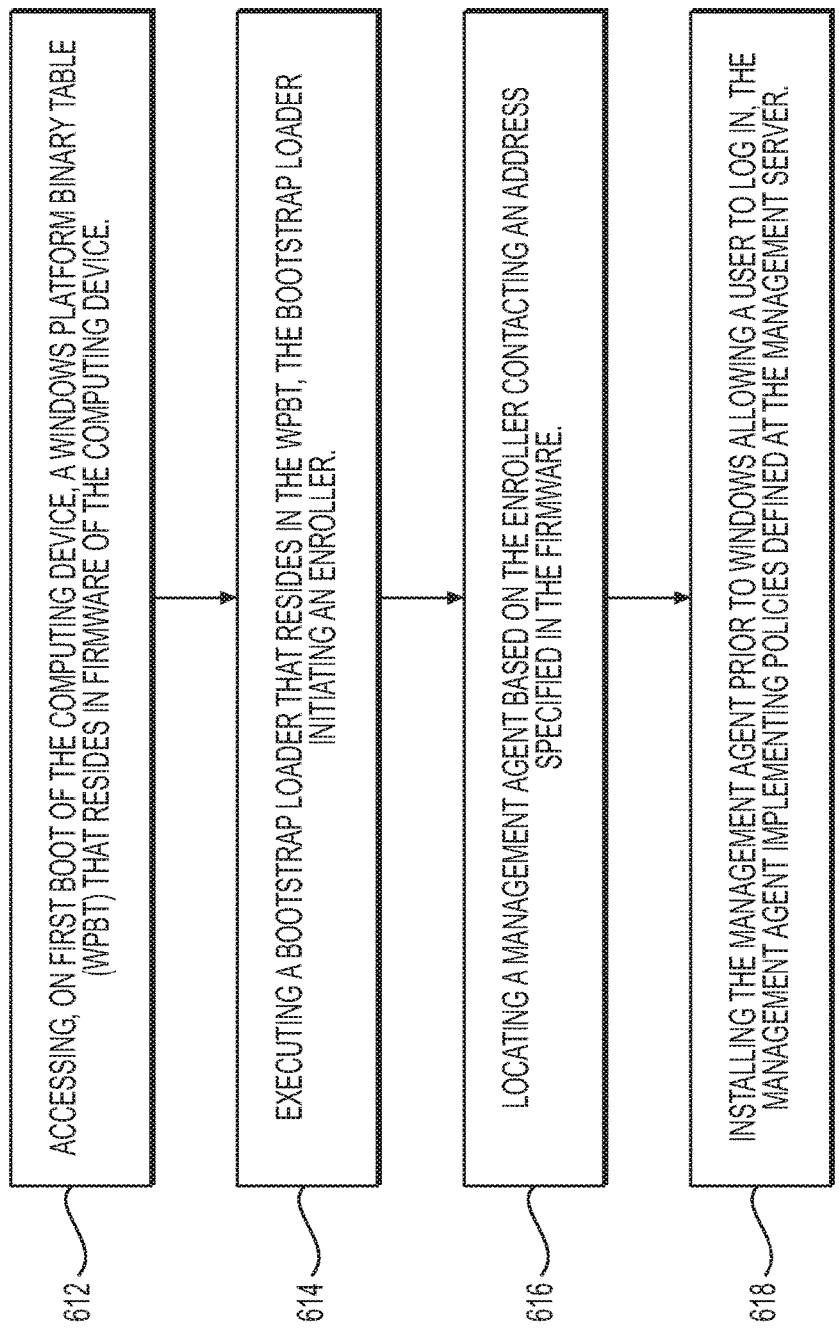
FIG. 6A is flowchart of an exemplary method for enrolling a computing device with a management server on first boot.

Turning to FIG. 6A, an exemplary method for enrolling a computing device 110 with a management server 130 on first boot is illustrated. At stage 612, the computing device can access the WPBT 114. This can be based on a flag 112 in the firmware 105 or a WINDOWS command. A processor 124 can execute WPBT 114 contents on first boot, prior to a user logging into WINDOWS.

At stage 614, the processor 124 can execute a bootstrap loader 115 that resides in the WPBT 114. The bootstrap loader 115 can initiate an enroller 138. The bootstrap loader 115 can be a kernel that executes in firmware 105. However, the enroller 138 can execute outside of the firmware 105 and access WINDOWS APIs and the Win32 Subsystem.

At stage 616, the enroller 138 can locate a management agent 132 based on the enroller 138 contacting an address specified in the firmware 105. The address can be local or a network address, such as over the Internet. In one example, the enroller 138 can check for an OS image 129 containing the management agent 132 in a local drive 126, such as in a hidden partition 128. Alternatively, the enroller 138 can wait for a network interface 122 to activate and then contact the address. This can be the address of a vendor server 140 or management server 130. The vendor server 140 can provide an additional address of the management server 130, in an example. The enroller 138 can download the management agent 132 from the management server 130.

At stage 618, the enroller 138 can install the management agent 132. This can happen prior to WINDOWS allowing a user to log in. The management agent 132 can implement policies 134 defined at the management server 130. For example, rules governing device or application usage can be downloaded from the management server 130 to the computing device 110 for access by or integration with the management agent 132.

Figure 6B:
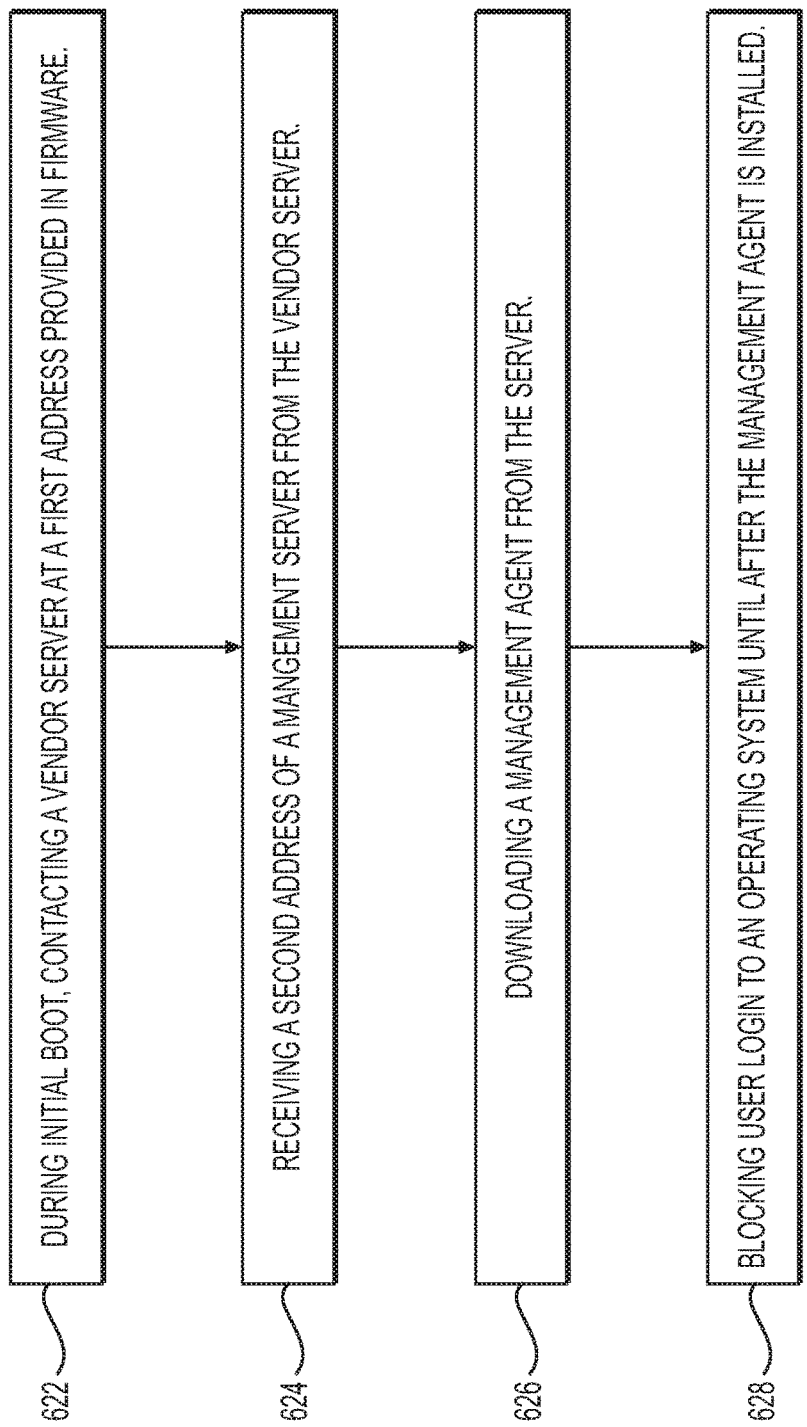
FIG. 6B is flowchart of an exemplary method for vendor auto-discovery.

Turning to FIG. 6B, an exemplary method for vendor auto-discovery is presented. At stage 622, during initial boot, the computing device 110 contacts a vendor server. To do this, the computing device uses a first address provided in firmware. The first address can be provided by the flag 112, in one example. In another example, the first address can be in the WPBT 114. In another example, it can be built into the bootstrap loader 115, which initiates the enroller 138 to also have the first address in its possession. In still another example, the firmware points the computing device 110 to the first address in a drive 126 location, such as the hidden partition 128.

At stage 624, the computing device 110 can receive a second address of a management server 130 from the vendor server 140. The vendor server 140 can be contacted by the enroller 138 at the first address. The vendor server 140 can determine if the computing device is managed, and if so, return the second address.

At stage 626, the computing device 110 can download the management agent 132 from the server 130. This can include code that executes management functions and enforces policies 134 on the computing device 110. It can also include code that changes settings of an integrated management agent 132 in the OS 111 that is loading at the computing device 110.

At stage 628, the enroller can block user login into the operating system 111 until after the management agent 132 is installed. Enrolling and synchronizing the computing device 110 with the management server 130 can be completed before the user has access to WINDOWS.

Figure 6C:
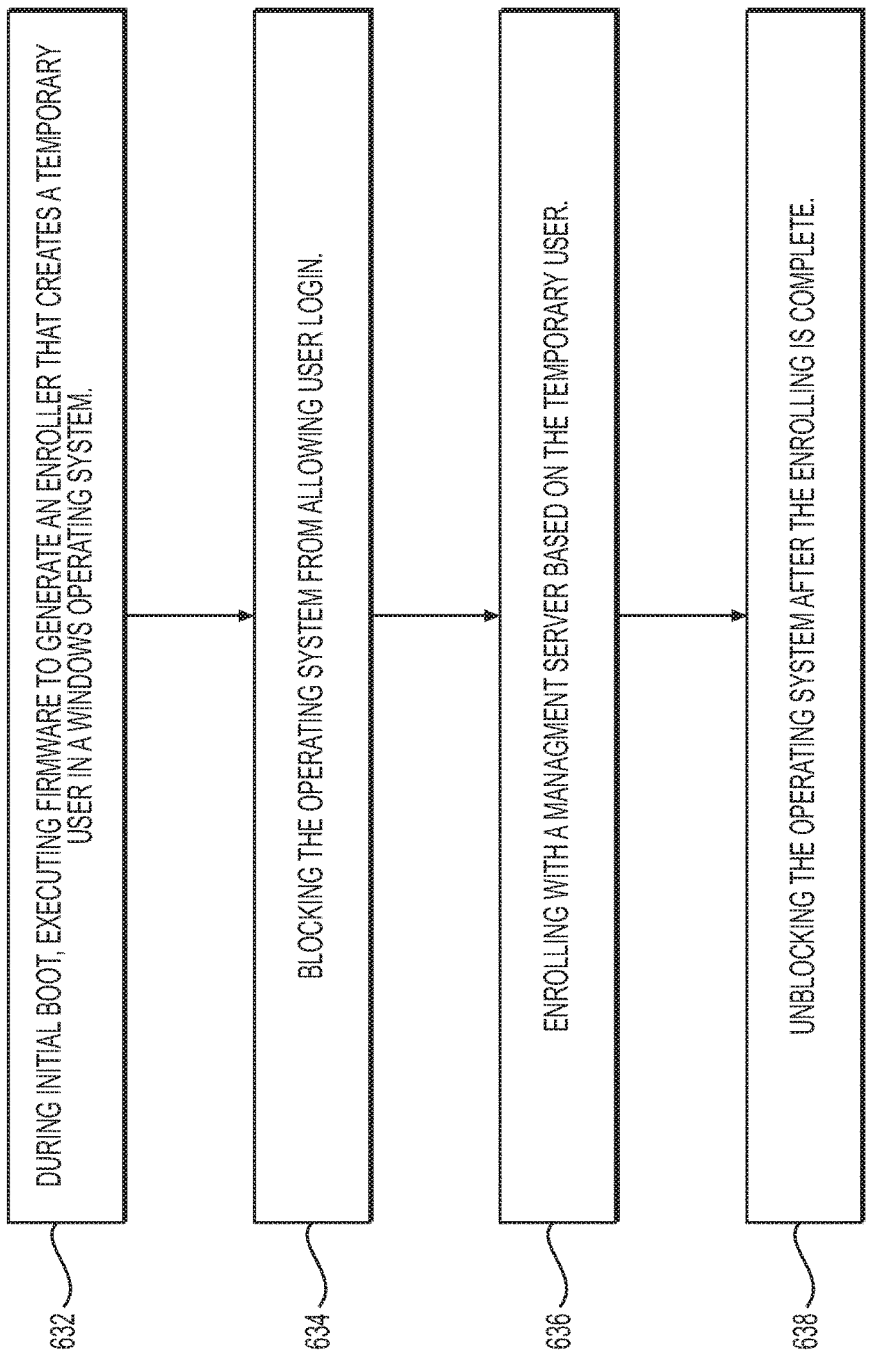
FIG. 6C is flowchart of an exemplary method for enrolling a computing device with a temporary user.

Turning to FIG. 6C, an exemplary method for enrolling the user device prior to learning the identity of the user is presented. At stage 632, during initial boot, a processor 124 can execute firmware 105 to generate an enroller 138. Any of the techniques already discussed are applicable here. The enroller 138 can create a temporary user in a WINDOWS operating system. In one example, the enroller 138 must first update itself at the management server 130 to download the proper credentials to use for the temporary user.

At stage 634, the enroller 138 can block the operating system 111 from allowing user login. This can be done by suspending operation of a binary that must execute in a sequence for WINDOWS to load.

At stage 636, the enroller 138 can use the network interface 122 to request enrollment with a management server 130. The user is presented to the management server as the temporary user, which the management server 130 can recognize. Enrollment can then occur, and user account details can be momentarily filled by the temporary user.

At stage 638, the enroller 138 can unblock the operating system 111. In one example, the management server 130 can send a message to the enroller 138 or management agent 132 to signify that enrollment is complete.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

Although described in the context of an EMM system, the techniques for detecting and enforcing driving restrictions do not require an EMM system. The firmware bootstrapping techniques can also be carried out without a management server.

What is claimed is:

1. A method for enrolling a computing device with a management server on first boot of the computing device, comprising:
    accessing, on first boot of the computing device, a Windows Platform Binary Table (WPBT) that resides in firmware of the computing device;
    executing a bootstrap loader that resides in the WPBT, the bootstrap loader initiating an enroller;
    locating a management agent based on the enroller contacting a specified address; and
    installing the management agent prior to an operating system allowing a user to log in, the management agent implementing policies defined at the management server.

2. The method of claim 1, further comprising:
    establishing communication over a network between the enroller and a first server at the address, wherein the first server provides a second address for the management server; and
    receiving the management agent from the management server.

3. The method of claim 1, wherein the bootstrap loader is executed based on the operating system running an SMPexecuteCommand that identifies the bootstrap loader.

4. The method of claim 1, wherein the firmware of the computing device includes a Unified Extensible Firmware Interface (UEFI).

5. The method of claim 1, wherein the firmware includes a BIOS.

6. The method of claim 1, wherein the bootstrap loader is a kernel driver and the enroller executes outside the kernel and waits for a Win32 process to activate a network interface.

7. The method of claim 1, wherein the bootstrap loader accesses an application programming interface (API) of the operating system to inject the management agent.

8. The method of claim 1, wherein the enroller blocks login to the operating system until after the computing device has enrolled with the management server.

9. The method of claim 1, wherein the enroller updates itself by downloading an updated enroller from the management server.

10. A computing device that enrolls at a management server upon first boot, comprising:
    a processor;
    an operating system; and
    firmware comprising:
        a Windows Platform Binary Table (WPBT); and
        an executable bootstrap loader in the WPBT;
        wherein the processor performs stages including:
            accessing the WPBT on first boot and executing the bootstrap loader, the bootstrap loader installing an enroller; and installing a management agent located by the enroller prior to an operating system completing boot up, the management agent implementing policies defined at the management server.

11. The computing device of claim 10, wherein locating the management agent includes identifying a server address in the firmware that the firmware contacts after a network interface is active.

12. The computing device of claim 11, wherein the processor performs further stages including:
communicating over the network with the management server; and
downloading the management agent from the management server.

13. The computing device of claim 10, wherein the processor performs further stages including blocking the operating system from allowing user login until after the computing device has enrolled with the management server.

14. The computing device of claim 10, wherein the processor performs further stages including:
waiting for a network interface to activate; and
updating the enroller by communicating with the management server through the network interface.

15. The computing device of claim 10, wherein the processor is an auxiliary processor that is separate from a central processing unit of the computing device.

16. A non-transitory, computer-readable medium comprising instructions that, when executed by a processor of a computing device, cause the processor to perform stages for enrolling the computing device with a management server, the stages comprising:
executing, on first boot, a bootstrap loader located in a Windows Platform Binary Table (WPBT) in firmware of the computing device;
installing an enroller based on the execution of the bootstrap loader;
executing the enroller to perform stages including:
identifying a management agent; and
injecting the management agent into an operating system prior to allowing a user to log into the operating system.

17. The non-transitory, computer-readable medium of claim 16, wherein the bootstrap loader is part of a UEFI or BIOS.

18. The non-transitory, computer-readable medium of claim 16, wherein identifying the management agent includes:
contacting a server identified in the firmware to receive a location of the management server; and
downloading the management agent from the management server.

19. The non-transitory, computer-readable medium of claim 16, wherein the bootstrap loader is a kernel driver.

20. The non-transitory, computer-readable medium of claim 16, wherein the stages further include updating the enroller prior to enrolling the computing device with the management server.

* * * * *